United States Patent
Yamanaka

(10) Patent No.: US 6,617,269 B2
(45) Date of Patent: *Sep. 9, 2003

(54) LEAD-FREE TIN SILICATE-PHOSPHATE GLASS AND SEALING MATERIAL CONTAINING THE SAME

(75) Inventor: Toshio Yamanaka, Otsu (JP)

(73) Assignee: Nippon Electric Glass Co. Ltd., Otsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/863,085

(22) Filed: May 22, 2001

(65) Prior Publication Data

US 2002/0019303 A1 Feb. 14, 2002

(51) Int. Cl.[7] ............................. C03C 8/08; C03C 8/14; C03C 3/062
(52) U.S. Cl. ............................. 501/24; 501/17; 501/73
(58) Field of Search ............................. 501/11, 14, 15, 501/17, 21, 32, 41, 45, 73, 77

(56) References Cited

U.S. PATENT DOCUMENTS 5,880,045 A * 3/1999 Cao et al. ............... 106/DIG. 1
6,306,783 B1 * 10/2001 Yamanaka ................... 501/15
6,309,989 B1 * 10/2001 Kikutani ..................... 501/15
6,355,586 B1 * 3/2002 Usui et al. ................... 501/15

FOREIGN PATENT DOCUMENTS

JP 11-292564 * 10/1999
JP 2000-169183 A * 6/2000

* cited by examiner

*Primary Examiner*—David Sample
*Assistant Examiner*—Elizabeth Bolden
(74) *Attorney, Agent, or Firm*—Collard & Roe, P.C.

(57) ABSTRACT

A sealing material for electric parts containing a lead-free tin silicate-phosphate glass of 50–100 volume percents and refractory fillers of the balance. The lead free tin silicate-phosphate glass consists essentially of, by molecular percent, 30–80% SnO, 5.5–20% $SiO_2$, and 10–50% $P_2O_5$. The glass may contain at least one of glass stabilizing elements, said glass stabilizing elements including 3–25% ZnO, 0–4.9% $B_2O_3$, 0–5% $Al_2O_3$, 0–10% $WO_3$, 0–10% $MoO_3$, 0–10% $Nb_2O_5$, 0–10% $TiO_2$, 0–10% $ZrO_2$, 0–15% $R_2O$ (R is Li, Na, K, and/or Cs), 0–5% CuO, 0–5% MnO, 0–10% R'O (R' is Mg, Ca, Sr and/or Ba), a total content of at least one of the glass stabilizing elements being up to 40%.

17 Claims, No Drawings

LEAD-FREE TIN SILICATE-PHOSPHATE GLASS AND SEALING MATERIAL CONTAINING THE SAME

FIELD OF THE INVENTION

This invention relates to a sealing material having a low sealing temperature and, in particular, to lead free glass used in the sealing material.

BACKGROUND OF THE INVENTION

The sealing material has been used for sealing glass, ceramics and/or metals to each other. The sealing material is usually consists essentially of glass and fillers. For sealing electronic parts, the sealing material is desired to have a low sealing temperature.

Lead borate glass, typically, lead-zinc borate glass has conventionally been used as the low temperature glass in the sealing material which preferably has a sealing temperature of 430–500° C. and a thermal expansion coefficient (TEC) of $70$–$100 \times 10^{-7}/°$ C.

However, it is desired to avoid use of lead compounds for the health and safety.

SUMMARY OF THE INVENTION

It is an object of this invention provide to lead-free tin silicate-phosphate glass of an improved mechanical strength and a weather resistance by using common oxide $SiO_2$ as a glass forming element other than $P_2O_5$.

It is another object of this invention to provide a sealing material comprising fillers and lead-free tin silicate-phosphate glass containing silica as a glass forming element.

According to this invention, a lead-free tin silicate-phosphate glass as a sealing material is obtained which consists essentially of, by molecular percent, 30–80%, preferably, 40–60% SnO, 5.5–20%, preferably, 5.5–10% $SiO_2$, 10–50%, preferably, 24.1–40% $P_2O_5$.

The lead free tin silicate-phosphate glass can contains at least one of glass stabilizing elements including 0–35% ZnO, 0–20% $B_2O_3$, 0–10% $Al_2O_3$, 0–20% $WO_3$, 0–20% $MoO_3$, 0–15% $Nb_2O_5$, 0–15% $TiO_2$, 0–15% $ZrO_2$, 0–35% $R_2O$ (R is Li, Na, K, and/or Cs), 0–10% CuO, 0–10% MnO, 0–15% R'O (R' is Mg, Ca, Sr and/or Ba), a total content of at least one of the glass stabilizing elements being up to 40%.

According to an embodiment of this invention, a sealing material comprises the lead free tin silicate-phosphate glass described above of 50–100% in volume and the balance of refractory fillers. As refractory fillers, cordierite, tin dioxide, diniobium pentaoxide can be used. Zirconium phosphate, willemite and mullite can also be used as the fillers.

DESCRIPTION OF THE PREFERRED EMBODIMENTS

The lead-free glass used together with fillers in a sealing material according to this invention is a tin silicate-phosphate ($SiO_2$—$P_2O_5$—SnO) glass which consists essentially of, by molecular percent, 30–80% SnO, 5.5–20% $SiO_2$ and 10–50% $P_2O_5$.

SnO of 30–80% is contained to lower a melting point of the resultant glass. SnO content less than 30% excessively raises the viscosity of the resultant glass so that the sealing material using the glass has a disadvantageous high sealing temperature. If SnO content is more than 80%, the resultant material does not glass.

$SiO_2$ is used as a glass-forming element and contained by an amount of 5.5–20%, preferably 5.5–10%. In use of $SiO_2$ content less than 5.5%, the resultant glass has insufficient improvement of the mechanical strength and the weather resistance. $SiO_2$ content more than 20% excessively raises the viscosity of the resultant glass.

$P_2O_5$ of 10–50%, preferably 24.1–40%, is contained together with $SiO_2$ as glass-forming elements. If $P_2O_5$ is less than 10%, the resultant material does not form glass. If $P_2O_5$ is more than 50%, drawback inherent to phosphate glass is remarkably present in the resultant glass.

$SiO_2$—$P_2O_5$—SnO glass according to this invention may contain at least one of glass stabilizing elements. The glass stabilizing elements include ZnO, $B_2O_3$, $Al_2O_3$, $WO_3$, $MoO_3$, $Nb_2O_5$, $TiO_2$, $ZrO_2$, $R_2O$ (R is Li, Na, K, and/or Cs), CuO, MnO R'O (R' is Mg, Ca, Sr and/or Ba). The total content of at least one of the glass stabilizing elements is up to 40%. If the stabilizing-element content is more than 40%, the resultant glass is rather unstable and is readily devitrified at a shaping process, which is disadvantageous.

ZnO has a function for lowering a melting point as well as stabilizing glass and may be contained by 0–35%, preferably, 3–25%. ZnO content more than 35% increases crystallization of the resultant glass and lowers flowability of the glass.

$B_2O_3$ content is 0–20%, preferably, 0–10%, and more preferably 0–4.9%. $B_2O_3$ content more than 20% disadvantageously increases viscosity of the glass.

When $B_2O_3$ is contained in the glass, it is desired to determine ($B_2O_3$ content)/($P_2O_5$ content)<0.20 in order to suppress raise of glass transition point.

$Al_2O_3$ content is 0–10%, preferably, 0–5%. $Al_2O_3$ content more than 10% disadvantageously increases viscosity of the glass.

Each of $WO_3$ and $MoO_3$ contents is 0–20%, preferably, 0–10%. When any one of them is contained more than 20%, the resultant glass increases in the viscosity disadvantageously.

Each of $Nb_2O_5$, $TiO_2$, and $ZrO_2$ contents is 0–15%, preferably, 0–10%. More than 15% content disadvantageously increases crystallization of the glass.

$R_2O$ content is 0–35%, preferably, 0–15%. More than 35% content disadvantageously increases crystallization of the glass.

Each of CuO and MnO contents is 0–10%, preferably, 0–5%. More than 10% makes the glass unstable.

R'O content is 0–15%, preferably, 0–10%. More than 15% makes the glass unstable.

Further, it is possible to contain F so as to lower the melting point of the glass. The F content is selected to determine F/(F+O)≦0.3, preferably, F/(F+O)≦0.1, in molecular percent. When F/(F+O) is larger than 0.3, the glass is unstable.

The lead-free $SiO_2$—$P_2O_5$—SnO glass according to this invention has a glass transition point of 250–350° C. and an excellent flowability at a temperature of 500° C. or less. The TEC of the glass is $90$–$150 \times 10^{-7}/°$ C.

The $SiO_2$—$P_2O_5$—SnO glass according to this invention itself can be used as a sealing material, without fillers, for materials having a compatible TEC. In use for sealing other materials having TEC non-compatible to the glass, for example, alumina having TEC of $70 \times 10^{-7}/°$ C., window glass plate having TEC of $85 \times 10^{-7}/°$ C. and others, the glass of this invention is mixed with refractory fillers of low expansion coefficient and is used as a composite type sealing material. The refractory fillers can be mixed with the glass of this invention not only for adjusting the TEC but also for improving the mechanical strength of the seal as formed.

In a composite type sealing material, refractory fillers are mixed by 50 volume % or less with the glass of this invention of the balance. Mix of refractory fillers more than 50 volume % makes the flowability of the sealing material low to a level insufficient for sealing because the glass content is excessively low.

Though various refractory fillers can be used, cordierite, tin dioxide, and diniobium pentaoxide are preferable fillers because their mixture with the glass are stable in the alter glass. Zircon, zirconium phosphate, willemite, mullite, and the like can be used as fillers in the sealing material.

In production of the sealing material using the lead free $SiO_2$—$P_2O_5$—$SnO$ glass according to this invention, a glass batch is prepared and then melted to produce glass. The melting must be carried out with care so that SnO is not oxidized into SnO2 during the melting process. To this end, it is recommended that the melting is conducted in a non-oxidizing atmosphere such as N2 atmosphere.

Thereafter, the molten glass is shaped, ground and classified to obtain glass powder. Thereafter, refractory fillers are mixed with into the glass powder if it is desired. Thus, a powdery sealing material is obtained.

In use of the sealing material, the powdery sealing material is mixed with an organic solvent to form a paste. The paste is applied or coated onto bonding surfaces of target objects to be joined and sealed. Then, the target objects are brought into contact with each other at their bonding surfaces and are subjected to baking or firing at a condition where the bonding surfaces of the target objects get wet sufficiently. It is effective that the baking or firing is carried out in the non-oxidizing atmosphere.

EXAMPLE 1

Glass samples Nos. 1–16 according to this invention shown in Tables 1–4 were produced herein below.

TABLE 1

|  | 1 | 2 | 3 | 4 |
|---|---|---|---|---|
| Glass Composition (mol %) | | | | |
| SnO | 52.9 | 47.9 | 42.9 | 37.9 |
| $SiO_2$ | 7.0 | 8.0 | 6.0 | 5.8 |
| $P_2O_5$ | 35.2 | 35.2 | 37.2 | 35.4 |
| ZnO | 4.9 | 8.9 | 13.9 | 20.9 |
| Melting Temperature (° C.) | 900 | 800 | 850 | 850 |
| Melting Atmosphere | air | air | air | air |
| Firing Temperature (° C.) | 460 | 460 | 460 | 460 |
| Glass Transition Point (° C.) | 255 | 264 | 260 | 280 |
| TEC (x $10^{-7}$/° C.) | 127 | 123 | 117 | 105 |
| Flow Button Diameter (mm) | 25.0 | 25.0 | 24.5 | 22.5 |

TABLE 2

|  | 5 | 6 | 7 | 8 |
|---|---|---|---|---|
| Glass Composition (mol %) | | | | |
| SnO | 47.9 | 42.9 | 42.9 | 42.9 |
| $SiO_2$ | 6.0 | 6.0 | 6.0 | 6.0 |
| $P_2O_5$ | 33.2 | 30.2 | 36.2 | 36.2 |
| ZnO | 10.9 | 10.9 | 10.9 | 10.9 |
| $B_2O_3$ | 2.0 | 10.0 | 4.0 | 4.0 |
| $B_2O_3/P_2O_5$ | 0.06 | 0.33 | 0.11 | 0.11 |

TABLE 2-continued

|  | 5 | 6 | 7 | 8 |
|---|---|---|---|---|
| Melting Temperature (° C.) | 800 | 800 | 800 | 850 |
| Melting Atmosphere | air | air | $N_2$ | $N_2$ |
| Firing Temperature (° C.) | 460 | 480 | 480 | 480 |
| Glass Transition Point (° C.) | 278 | 320 | 275 | 290 |
| TEC (x $10^{-7}$/° C.) | 120 | 103 | 110 | 118 |
| Flow Button Diameter (mm) | 25.0 | 24.2 | 26.0 | 23.2 |

TABLE 3

|  | 9 | 10 | 11 | 12 |
|---|---|---|---|---|
| Glass Composition (mol %) | | | | |
| SnO | 41.9 | 47.9 | 44.9 | 44.9 |
| $SiO_2$ | 6.9 | 6.9 | 7.0 | 7.0 |
| $P_2O_5$ | 30.2 | 30.0 | 34.2 | 34.2 |
| ZnO | 10.0 | 10.0 | 10.9 | 10.9 |
| $B_2O_3$ | 1.0 | — | — | — |
| Others | $Li_2O$ | $Cs_2O$ | CuO | MnO |
|  | 10.0 | 5.2 | 3.0 | 3.0 |
| $B_2O_3/P_2O_5$ | 0.03 | — | — | — |
| Melting Temperature (° C.) | 800 | 750 | 800 | 800 |
| Melting Atmosphere | $N_2$ | $N_2$ | air | air |
| Firing Temperature (° C.) | 460 | 460 | 460 | 460 |
| Glass Transition Point (° C.) | 255 | 259 | 267 | 250 |
| TEC (x $10^{-7}$/° C.) | 130 | 125 | 116 | 119 |
| Flow Button Diameter (mm) | 25.5 | 24.8 | 23.0 | 23.6 |

TABLE 4

|  | 13 | 14 | 15 | 16 |
|---|---|---|---|---|
| Glass Composition (mol %) | | | | |
| SnO | 43.9 | 45.9 | 46.9 | 37.9 |
| $SiO_2$ | 7.0 | 6.0 | 6.0 | 6.0 |
| $P_2O_5$ | 33.2 | 35.2 | 35.2 | 35.2 |
| ZnO | 7.9 | 10.9 | 10.9 | 10.9 |
| $B_2O_3$ | 2.0 | — | — | — |
| Others | MgO | $WO_3$ | $Nb_2O_5$ | $SnF_2$ |
|  | 6.0 | 2.0 | 1.0 | 10.0 |
| F/(F + O) | — | — | — | 0.08 |
| $B_2O_3/P_2O_5$ | 0.06 | — | — | — |
| Melting Temperature (° C.) | 800 | 800 | 800 | 800 |
| Melting Atmosphere | air | air | air | $N_2$ |
| Firing Temperature (° C.) | 460 | 460 | 460 | 450 |
| Glass Transition Point (° C.) | 286 | 286 | 271 | 250 |
| TEC (x $10^{-7}$/° C.) | 115 | 124 | 120 | 130 |
| Flow Button Diameter (mm) | 23.5 | 23.3 | 24.0 | 24.0 |

At first, raw materials were blended to make a glass batch of a composition corresponding to each of the samples. The glass batch was melted in $N_2$ or air in an alumina crucible for 1–2 hours at a temperature of 750–900° C. During melting in the air, the crucible was closed by the use of a lid. The molten glass was passed through water-cooled rolls to form a thin plate. The thin plate was crashed and ground in a ball mill and screened by the use of a sieve having openings of 105 micrometers ($\mu$m) to obtain glass powder having an average particle size of 10 micrometers ($\mu$m).

Then, each of glass samples were measured in the glass transition point, the TEC, and flowability and are shown in Tables 1–4. It is noted from those Tables that each of glass samples according to this invention has the glass transition point of 250–320° C., TEC of 103–130×$10^{-7}$/° C. over the temperature range of 30–250° C., and a flowing diameter of 22.5–26.0 mm which means an excellent flowability.

The glass transition point and the TEC were measured by the use of a differential thermal analyser (DTA) and by the use of a push-rod type thermal expansion measuring device, respectively.

In estimating the flowability, flow diameter is measured. Each of the glass samples of an amount corresponding to the density of the glass itself was put into a press-mold to thereby be shaped into a button having an outer diameter of 20 mm. The button was put on a window glass plate and was heated to a baking or firing temperature shown in Tables 1–4 at a ramp up rate of 10° C./minute. After the button was kept at the baking or firing temperature for ten minutes, it was cooled to R.T. and a diameter of the button flown was measured.

EXAMPLE 2

Powder of glass sample No. 1 in Example 1 was mixed with cordierite powder at a ratio of the former of 75 volume % and the latter of 25 volume % and thereby produced a sealing material.

In the similar manner as in Example 1, the sealing material was measured in TEC and flowability. The measured TEC was $75 \times 10^{-7}$/° C. at a temperature of 30–250° C. which is adaptable to seal window glass plates to each other. The flow diameter was 23.0 mm which shows an excellent flowability.

The cordierite powder used was prepared as follows. Glass having the stoichiometric composition represented by $2MgO \cdot 2Al_2O_3 \cdot 5SiO_2$ was ground and passed through a screen having openings of 105 micrometers ($\mu$m) to obtain glass powder. The glass powder was heated at a temperature of 1350° C. for ten hours and thereby obtained a crystallized material. The crystallized material was ground and passed through a screen having an openings of 45 micrometers ($\mu$m). Thus, the cordierite powder was obtained.

The glass according to this invention can also be used in various applications as, for example, barrier ribs and dielectric layer in plasma displays.

Further, the glass according to this invention can be mixed with various fillers to control the TEC, and therefore, can be used as sealing materials for electronic parts such as magnetic heads, CRTs, plasma displays, fluorescent character indicating tubes, and others.

What is claimed is:

1. A tin silicate-phosphate glass which consists essentially of, by molecular percent, 40–60% SnO, 5.5–20% $SiO_2$, 24.1–40% $P_2O_5$ and glass stabilizing elements including 3–25% ZnO and other optional glass stabilizing elements including 0–20 $B_2O_3$, 0–10% $Al_2O_3$, 0–20% $WO_3$, 0–20% $MoO_3$, 0–15% $Nb_2O_5$, 0–15% $TiO_2$, 0–15% $ZrO_2$, 0–35% $R_2O$ (R is Li, Na, K, and/or Cs), 0–10% CuO, 0–10% MnO, 0–15% R'O (R' is Mg, Ca, Sr, and/or Ba), a total content of at least one of the glass stabilizing elements being up to 40%.

2. A tin silicate-phosphate glass as claimed in claim 1, wherein an amount of $SiO_2$ is 5.5–10%.

3. A tin silicate-phosphate glass as claimed in claim 1, wherein an amount of $B_2O_3$ is 0–10%.

4. A tin silicate-phosphate glass as claimed in claim 3, wherein an amount of $B_2O_3$ is 0–4.9%.

5. A tin silicate-phosphate glass as claimed in claim 1, wherein an amount of $Al_2O_3$ is 0–5%.

6. A tin silicate-phosphate glass as claimed in claim 1, wherein an amount of $WO_3$ is 0–10%.

7. A tin silicate-phosphate glass as claimed in claim 1, wherein an amount of $MoO_3$ is 0–10%.

8. A tin silicate-phosphate glass as claimed in claim 1, wherein an amount of $Nb_2O_5$ is 0–10%.

9. A tin silicate-phosphate glass as claimed in claim 1, wherein an amount of $TiO_2$ is 0–10%.

10. A tin silicate-phosphate glass as claimed in claim 1, wherein an amount of $ZrO_2$ is 0–10%.

11. A tin silicate-phosphate glass as claimed in claim 1, wherein an amount of $R_2O$ is 0–15%.

12. A tin silicate-phosphate glass as claimed in claim 1, wherein an amount of CuO is 0–5%.

13. A tin silicate-phosphate glass as claimed in claim 1, wherein an amount of MnO is 0–5%.

14. A tin silicate-phosphate glass as claimed in claim 1, wherein an amount of R'O is 0–10%.

15. A tin silicate-phosphate glass which consists essentially of, by molecular percent, 40–60% SnO, 5.5–10% $SiO_2$, 24.1–40% $P_2O_5$ and glass stabilizing elements including 3–25% ZnO and other optional glass stabilizing elements including 0–4.9% $B_2O_3$, 0–5% $Al_2O_3$, 0–10% $WO_3$, 0–10% $MoO_3$, 0–10% $Nb_2O_5$, 0–10% $TiO_2$, 0–10% $ZrO_2$, 0–15% $R_2O$ (R is Li, Na, K, and/or Cs), 0–5% CuO, 0–5% MnO, 0–10% R'O (R' is Mg, Ca, Sr, and/or Ba), a total content of at least one of the glass stabilizing elements being up to 40%.

16. A sealing material consisting essentially of, by volume percent, lead-free tin silicate-phosphate glass of 50–100% and refractory fillers of the balance, said lead-free tin silicate-phosphate glass consisting essentially of, by molecular percent, 40–60% SnO, 5.5–20% $SiO_2$, 24.1–40% $P_2O_5$ and glass stabilizing elements including 3–25% ZnO and other optional glass stabilizing elements including 0–20 $B_2O_3$, 0–10% $Al_2O_3$, 0–20% $WO_3$, 0–20% $MoO_3$, 0–15% $Nb_2O_5$, 0–15% $TiO_2$, 0–15% $ZrO_2$, 0–35% $R_2O$ (R is Li, Na, K, and/or Cs), 0–10% CuO, 0–10% MnO, 0–15% R'O (R' is Mg, Ca, Sr, and/or Ba), a total content of at least one of the glass stabilizing elements being up to 40%.

17. A sealing material consisting essentially of, by volume percent, lead-free tin silicate-phosphate glass of 50–100% and refractory fillers of the balance, said lead-free tin silicate-phosphate glass consisting essentially of, by molecular percent, 40–60% SnO, 5.5–10% $SiO_2$, 24.1–40% $P_2O_5$ and glass stabilizing elements including 3–25% ZnO and other optional glass stabilizing elements including 0–4.9% $B_2O_3$, 0–5% $Al_2O_3$, 0–10% $WO_3$, 0–10% $MoO_3$, 0–10% $Nb_2O_5$, 0–10% $TiO_2$, 0–10% $ZrO_2$, 0–15% $R_2O$ (R is Li, Na, K, and/or Cs), 0–5% CuO, 0–5% MnO, 0–10% R'O (R' is Mg, Ca, Sr, and/or Ba), a total content of at least one of the glass stabilizing elements being up to 40%.

* * * * *